United States Patent [19]

Fried

[11] 4,391,406

[45] Jul. 5, 1983

[54] POWER SAVING SYSTEM WHICH ASSURES ROOM SECURITY

[76] Inventor: Morton Fried, 706 Bolton Rd., Far Rockaway, N.Y. 11691

[21] Appl. No.: 337,701

[22] Filed: Jan. 7, 1982

[51] Int. Cl.³ .................. E05B 65/00; G05D 23/00
[52] U.S. Cl. ............................. 236/47; 165/11 R; 70/57; 200/61.62
[58] Field of Search ................ 165/11; 236/47, 1 R, 236/94; 307/140; 200/61.62; 70/57

[56] References Cited

U.S. PATENT DOCUMENTS 4,101,886  7/1978  Grimes et al. .................. 165/14
4,315,596  2/1982  Johnson, Jr. et al. ............ 165/11 R Primary Examiner—William E. Wayner

[57] ABSTRACT

A power saving unit which also assures room security by requiring a door to be properly locked before particular electric loads will be energized. The system includes switches connected to the door providing indication of whether the door is open, closed, or locked. A control circuit controls the energization of a particular electric load connected to the system. A suitable gate responds to the door being locked or opened to activate the control circuit for maintaining the load energized. It responds to the door being closed but unlocked to keep the load energized for a predetermined interval of time after which the load will be switched off. Suitable indicator lights are provided to remind the guest to lock his door in order to retain the loads energized.

8 Claims, 1 Drawing Figure

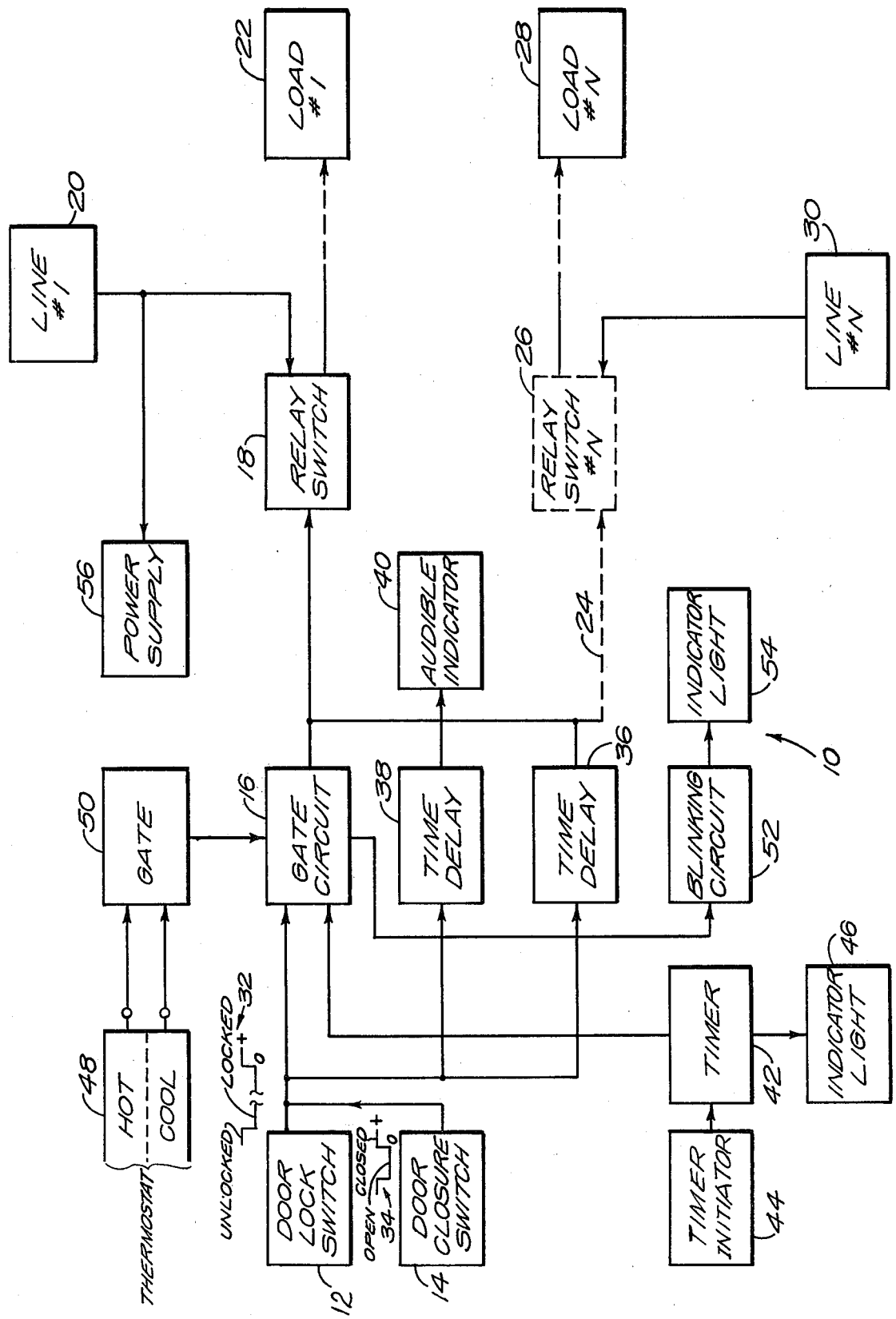

POWER SAVING SYSTEM WHICH ASSURES ROOM SECURITY

BACKGROUND OF THE INVENTION

This invention relates to a power saving system, and more particularly to a power saving system which also provides for increased room security and protection.

With the dramatic increase in the cost of energy, there is a continuous interest in reducing the use of electrical apparatus and, especially eliminating unnecessary use of such apparatus. The problem of energy cost is of special interest in the hotel and motel industry. In almost all rooms, there is provided some sort of a heating and/or air conditioning unit, as well as other electrical devices, such as televisions, refrigerators, appliances, and lighting. Despite the reminders provided by the management, guests have a tendency of leaving on these appliances even when they leave the room itself. As a result, the appliances may continue operating for many hours until the cleaning personnel reach the room and are able to shut off the appliances.

Although there are numerous electrical appliances provided in the room, the greatest energy drain usually comes from the heating and/or air conditioning equipment in the room, and it is generally these, of all electrical appliances which the guests tend to leave on as they depart from the room.

Accordingly, it would be desirable to provide for a power saving system which can be utilized in hotels and motels, which would automatically shut off electrical loads when the rooms are not occupied. Even if such system were utilized only on the heating and air conditioning units, this alone would provide for a substantial reduction in energy costs.

In providing such a system, however, it must be remembered that the guest must be able to control the electric appliances and other electric loads in the room while he occupies it. Also, provision must be made for permitting service personnel such as maids, repairman, etc. for servicing the rooms without having some of the electrical appliances being turned off on them.

Accordingly, an important aspect of saving energy costs in hotels, motels and the like, is being able to detect when the room is being occupied and, on the other hand, when the premises have been vacated. An adjunct area of interest requiring the same type of detecting concerns room security. With increased security problems facing hotel and motel management, it would also be desirable to assure that the room is adequately protected during the time that it is occupied. Accordingly, detection of the occupancy of the room is important for both power saving systems, as well as for room security systems.

SUMMARY OF THE INVENTION

Accordingly it is an object of the present invention to provide a power saving system which also assures room security.

A further object of the present invention is to provide a power saving system which requires the occupant of a room to suitably lock the door of the room.

Still another object of the present invention is to provide a power saving system which detects the presence or absence of individuals in the room and adjusts electrical loads in the room accordingly.

A further object of the present invention is to provide a power saving system which determines when a room is occupied and controls electrical loads therein accordingly, and at the same time requires the occupant of the room to properly lock and bolt the door of the room.

Still another object of the present invention is to provide a power saving system which assures room security by requiring the occupant to properly lock his door in order for electrical loads to be energized in the room.

Yet a further object of the present invention is to provide a power saving system which also assures room security and which can be either initially built in the room or can be added subsequent to construction of the room.

Briefly, in accordance with the present invention, there is provided a power saving system which also assures room security. This system includes a switching mechanism provided in conjunction with the door locking system and which produces a lock signal indicative of the proper locking of the door. A suitable gating circuit responds to the lock signal and activates a control circuit. The control circuit serves to energize electrical loads connented thereto. Upon activation of the control circuit, the load is maintained in an energized state for the duration of time that the door is properly locked.

In an embodiment of the invention, there is also provided a switch device which detects when the door is open or closed, even without being locked. When the door is open, it sends a suitable signal to the gating circuit so that the electrical load will remain energized during the time that the door is open. When the door is closed, although unlocked, a suitable closure signal is sent to a timing circuit which activates the control circuit for a predetermined time interval so as to maintain the electrical load energized for that time limit. After such time limit, the electrical load will no longer be suitably energized.

As a result, when a guest enters a room, when the door is opened to let the guest in and have him arrange his luggage in the room, the electrical load in the room will be energized. When the guest closes the door, if he fails to lock the door, the electrical load will remain energized for a predetermined interval of time, after which it will cease being properly energized. This will serve as a reminder for the guest to suitably lock his door. Once the guest properly locks the door, not only does he provide the necessary security for his room, but this will cause the electrical load to be energized while he remains in the locked room.

When the guest leaves the room, after he closes the door, the electrical loads will stop being properly energized after the predetermined interval of time.

In this manner, various electrical loads, particularly heating and/or air conditioning units can be controlled so that after the guest leaves the room, either these units will be completely de-energized, or a low level of operation of these units can be maintained to prevent the rooms from getting too hot or too cold in the complete absence of such heating/air conditioning units.

The aforementioned, objects, features and advantages of the invention will, in part, be pointed out with particularity, and will, in part, become obvious from the following more detailed description of the invention, taken in conjunction with the accompanying drawings, which forms an integral part thereof.

BRIEF DESCRIPTION OF THE DRAWING

In the drawing, there is shown a block diagram of the present invention.

DESCRIPTION OF THE PREFERRED EMBODIMENT

Referring now to the drawing, there is shown a power saving system 10, which can either be initially installed or subsequently installed into a room. A door lock switch 12 is suitably positioned in a door locking system so as to be able to detect when the locking system has been properly locked. For example, it can be a contact associated with a safety chain, a switch built into the door jamb of a dead bolt lock, or any other switch which is associated with a door locking system on the door of a room. There is also provided, in parallel therewith, an additional door switch 14. This switch can typically be placed in the door jamb and detects when a door is open or closed. This signal does not detect proper locking of the locking device, but simply detects open and closure of the door itself. For both the switch 12 and 14, any well known type of switching mechanism can be utilized, as is conventional.

The output from the door lock switch 12 as well as the door closure switch 14 feed a gating circuit 16. This gating circuit includes well known standard gates which respond to zero and plus level signals in order to produce an output.

The output from the gate circuit 16 activates a solid switch relay 18 turning it on and thereby permitting energy from the power source 20 to pass through a particular electric load 22. Typically, the power source 20 would be the house line current and the load could be a heating or air conditioning unit. However, it should be appreciated that other types of electric loads could be utilized including all types of lighting, electrical appliances, etc. Additionally, motors can also be controlled in this manner, and, where required, each phase of the motor can be switched by means of a solid state relay switch 18. Of course, other types of switches could be utilized in place of switch 18, as is well known in the art. It should be appreciated, that although a high voltage is sent from the power source 20 to the load 22, the triggering of the solid state switch 18 can be at low voltage. In fact, because of such low voltage, the present system can be an approved class II system utilizing even telephone wire to connect to the solid state switch 20.

Although only one load 22 is shown, it should be appreciated that other loads could be placed along with load one and operated by the same solid state switch. Alternately, there is shown additional switches by means of the dotted lines 24 indicating that a plurality of such solid states switches can be controlled. Each of the solid state switches can include its own electric load which it controls, or, the additional solid states switches could control their own respective individual load. By way of example, one additional solid state switch 26 is shown, and an additional load 28 is also shown. However, many such switches and loads can be utilized.

There is also shown a separate line feeding the switch 26 from the power source 30. Separate power lines could be utilized, or, a common power line could be utilized, as desired.

As heretofore mentioned, the gate circuit 16 responds to a zero input in order to produce an output. Accordingly, the door lock switch 12 produces a plus level output voltage during the time that the locking device is unlocked. When the locking device is properly locked, it produces a zero level output, as shown at 32. As shown at 34, the output from the door closure switch 14 is a plus level voltage when the door is closed. When the door is opened, a zero voltage output is produced.

Receiving the output from the switches 12, 14, there is provided a time delay circuit 36. Such circuit responds to a positive change from zero level to a positive level in order to turn it on and begin its counting. On the other hand, when it receives a zero level input, it turns itself off. The output from the time delay 36 continues throughout its time delay. Such output is also sent to the solid state relay switch 18 to control it.

An additional delay 38 is also provided in parallel with the time delay 36. This delay responds in a similar manner. However, its time is set at a shorter interval then the time delay 36. The output from the time delay 38 is sent to control an indicator 40, shown as an audible sounding indicator.

With the circuit as shown, the operation is as follows. When a guest comes to a room, initially the door is closed and unlocked. As a result, the output from the door lock switch 12 will be a positive level and similarly the output from the door closure switch 20 will also be a positive level. As a result, the gate circuit 16 will not produce an output and the particular load controlled by relay switch 18 will not be energized from its power source.

When the guest initially walks into the room, he typically opens the door and spends a few minutes getting his room arranged. Usually a bellboy may come in with him and will set up the room. As soon as the door is opened, the door closure switch 14 will produce a zero level signal which will cause the gate circuit 16 to activate the relay switch 18 turning on the electric load 22. As long as the door remains open, the load 22 remains energized.

After the guest has organized his luggage, typically he will close the door. Should he simply close the door without locking the door, the door closure switch 14 will change from a zero level to a positive level. Because of the positive level, the gate circuit 16 will no longer activate the relay switch 18. However, the change from the zero to the positive level will cause the time delay 36 to become energized producing an output from the predetermined period of time to which it is set. Typically, this time can be set at approximately 6 minutes. Thus, for the six minute predetermined interval, the time delay 36 will produce an output activating the relay switch 18 so that the load will remain on for this 6 minute interval after the door has been closed.

The same change from zero to the positive level also serves to activate the time delay 38. The output from 38 is set to expire prior to the expiration of the time delay 36. For example, the time delay of 38 can be set to turn its output off after 4 minutes. The output from time delay 36 being on and time delay 38 being off causes the audible indicator 40 to sound for the last two minutes until expiration of the predetermined time delay 36 at which time the audible sound will also cease.

Accordingly, after the guest enters the room and closes the door without locking it, the electric loads in the room that are connected to the present system will continue to operate during 6 minutes. During the last 2 minutes, an audible indicator will be sounded reminding the individual to suitably lock the door. Should the guest properly lock the door, the door lock switch 12 produces a zero level signal which causes the gate circuit 16 to activate relay switch 18, thereby maintaining the electric load 22 energized permanently. This same zero signal will serve to stop operation of the time delays 36 and 38. As a result, the loads will remain on while the guest is in the room with the door properly locked.

Should the guest fail to lock the door during this time interval, the electric loads connected to the system will cease operating after the 6 minutes.

When the guest leaves the room for the day, as he closes the door behind him, the door closure switch will produce a change of voltage from zero to a positive level causing the time delays 36, 38 to operate. Thus, the electric loads will continue to operate for the time interval, typically 6 minutes, after the individual guest has left his room. After that time, the electric loads will stop being energized. Accordingly, after the guest leaves the room, even if he should fail to turn off the particular electric loads connected to the system, they will automatically be turned off and in this way save energy loss during the time that the guest is absent from the room.

It will thus be seen, that the present system provides both a power saving as well as a security system. While the guest is in the room, the system reminds him to suitably lock his door otherwise, particular electric loads in the room will stop operating. At the same time, after the guest leaves the room, the system will automatically turn off any electric loads within this system should the guest have neglected to turn it off.

On occasion, a guest may want to leave the room without having the electric load turned off after he walks out of the room. For example, if there are two guests, occasionally one guest may leave the room and want to return. At the same time he does not want the other guest to lock the door. This may occur where the remaining guest in the room is sleeping, or where only a single key is available, or other circumstances. In order to facilitate an individual guest leaving the room, while maintaining the electric load energized, there can be provided an additional timer unit 42 with an initiating timer switch 44. Such timer can be either electromechanical or its electronic equivalent, as is known in the art.

The timer with its initiating switch 44 can be placed on the wall. When the guest is ready to leave the room, he can activate the timer through the switch 44 and set the time that he plans to be away. For example, the timer can be a multiple of hours or half hours. If he sets the time for an hour, he can leave the room for this time without having the load become de-energized. The timer will produce an output signal which will cause the gate 16 to activate the relay switch 18 maintaining the electric load 22 operative during this time. In order to remind the guest that the electric load is being operated by means of the delay timer 42, there can be provided an indicator light connected to the unit.

During the time delay provided by timer 42, the load will remain on. After that if the door is not locked, the electric load will again become de-energized.

In most cases, the particular electric loads which would be connected to this system are the heating and air conditioning units. These units generally utilize most of the energy in a room and by using the power saving system even on these units alone, can save up to approximately 35% of the energy utilized in the room. However, it should be understood that other devices could similarly be connected.

In those cases where there is provided a local air conditioner and heater, the relay switch 18 could be connected directly in series between the line 20 and the load 22. Those rooms that have central air conditioning, usually also include local blowers. As a result, the relay switch 18 could be connected in series with the local blower working in conjunction with the central air-conditioning and central heating. Alternately, the relay switch could be connected in series with the local thermostat so as to thereby take over operation of the thermostat and de-energize the heating and air conditioning in the room when the occupant leaves the room. With the circuit as shown, once the occupant leaves the room, the particular electric load is completely de-energized. However, in many situations, it is preferrable not to completely de-energize the system but to alternately switch it to a different level of operation.

For example, in the case of air-conditioning, it may be desirable not to turn off the air conditioner entirely in the room once the occupant leaves it. By doing so, the room may become extremely hot and uncomfortable when the occupant returns. It would be preferrable to retain the air conditioning unit operative, however, to put it at a higher setting. In this way, the room is a bit cool but at the same time does not use up all of the energy that it would during occupancy.

Similarly, with heating, rather than completely turn off the heat when the occupant leaves the room, it might be desirable to maintain the heating unit at a low level value. In this way, the room is not completely cold when the occupant returns.

In order to do so, there can be provided an offset thermostat 48 whose output passes through a suitable gate circuit 50 which sends an input to gate circuit 16. The offset thermostat 48 takes over when gate circuit 16 is not energized by either the door lock switches 12, 14 or the timer 42. Accordingly, when the individual is no longer in the room, and even if he had left the particular heating/air conditioning unit fully on, the offset thermostat 48 would take over and reduce the levels of heating and/or air conditioning to predetermined values using less energy.

There is also shown provided a blinking circuit 52 which controls an indicator light 54 causing it to blink as a reminder that the door is not properly locked. The blinking circuit operates whenever the gate circuit 16 is not being controlled. Thus, when the individual guest enters the room and fails to suitably lock the door, the indicator light 54 will blink on and off reminding him to lock the door. The only time that it will not operate is either when the door is properly locked, or, when the timer 42 has provided a time delay.

Although not shown, it should be understood that a bypass switch can be placed in parallel with the door lock switch 12. Such bypass switch could be operated by means of an authorized key. As a result, service repairmen or others utilizing the room can remain in the room even though the door is not locked and still keep the electric loads operating.

The particular system shown is one that can be easily installed even after the room has been built. The particular switches 12, 14 can be easily added into the door locations. Simple telephone wires can be stapled along the wall in an unobtrusive manner to connect it to the particular electric unit being controlled. The electronic circuitry can actually be installed in a small box and connected into the wall outlet box into which the electric load can be hired, wired or plugged into this unit.

The power supply for the unit is shown at 56 and can be any standard power supply providing suitable voltage. The power supply itself can be energized from the line 20 serving the room. Of course, additional batteries can be included in the power supply so that in the case of a power failure the security system can be maintained.

There has been disclosed heretofore the best embodiments of the invention presently contemplated. However, it is to be understood that various changes and modifications may be made thereto without departing from the spirit of the invention.

I claim:

1. A power saving system for conserving energy consumption by electric loads in a room having a door with a locking system, and which system also assures room security, comprising:
   closure switch means for coupling to the door and producing a control signal only throughout the time the door is opened;
   lock switch means for coupling to the door locking system and producing a control signal only throughout the time of proper locking of the door, both said control signals being the same;
   control means associated with an electric load in the room, and
   wire means coupling said closure switch means and said lock switch means in parallel to said control means,
   said control means comprising timing means responsive to the termination of a control signal on said wire means for producing a control signal for a preset limited interval of time, and for ceasing operations upon the presence of a control signal on said wire means, and control switch means responsive to any of the aforesaid control signals for controlling the energization of the electric load during the time that a control signal is present.

2. A power saving system as in claim 1, and further comprising indicator means responsive to said timing means for producing an indicator output at a preset time prior to the expiration of said preset limited time interval.

3. A power saving system as in claim 1, and further comprising a timing mechanism settable for a desired time interval and producing a control signal for said desired time interval, said control switch means being responsive to said last mentioned control signal.

4. A power saving system as in claim 1, and further comprising indicator means responsive to the absence of a control signal for producing a reminder signal to lock the door.

5. A power saving system as in claim 1, wherein said control switch means comprises a switch device which can energize the electric load with high voltage levels and is itself activated by a low voltage level.

6. A power saving system as in claim 5, wherein said switch device comprises a solid state relay switch.

7. A power saving system as in claim 1, wherein the electric load is of the heating and/or air conditioning type, and further comprising an offset control unit for providing an offset signal during the absence of a control signal for activating said control means in accordance with predetermined conditions.

8. A power saving system as in claim 7, wherein said offset control unit comprises a thermostat.

* * * * *